(12) United States Patent
Saburi

(10) Patent No.: US 6,469,731 B1
(45) Date of Patent: Oct. 22, 2002

(54) PORTABLE VIDEOPHONE UNIT

(75) Inventor: Kazumi Saburi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/571,717

(22) Filed: May 15, 2000

(30) Foreign Application Priority Data

May 17, 1999 (JP) .......................................... 11-136402

(51) Int. Cl.⁷ ................................................ H04N 7/14
(52) U.S. Cl. ............................... 348/14.02; 348/14.01; 455/566
(58) Field of Search ........................... 348/14.01, 14.02, 348/14.03, 14.04, 14.05, 14.06, 14.07, 14.08, 14.09, 14.12, 14.13; 455/550, 566, 556

(56) References Cited

FOREIGN PATENT DOCUMENTS

GB          2294851 A   *   5/1996   ......... H04L/27/227
JP          408195947 A   *   7/1996   ............ H04N/7/14

* cited by examiner

Primary Examiner—Melur Ramakrishnaiah
(74) Attorney, Agent, or Firm—Hogan & Hartson, LLP

(57) ABSTRACT

The present invention has as an object thereof to provide a portable videophone unit which is capable of displaying images in the display without an unnatural feeling, even when the transmission of image data is not conducted satisfactorily. In portable videophone unit 10, an image is displayed in display 11 at the point in time at which all the image data of the image to be displayed are complete, and until then, the display of the previous image is continued. Furthermore, when the completeness of all the image data of the next image to be displayed cannot be confirmed within a preset time period, or when a predetermined number of data retransmission requests has been reached when the ARQ method is employed, it is possible to discard the image data of that image and to conduct the decoding of the image data of a subsequent image.

11 Claims, 5 Drawing Sheets

PORTABLE VIDEOPHONE UNIT

BACKGROUND OF THE INVENTION

1. Field of the Invention

The present invention relates to a portable videophone unit which is provided with a display and a camera and which is capable of conducting videophone communications by sending and receiving image data and sound data.

2. Description of Related Art

In recent years, there have been videophone units which are provided with a camera and a display and which conduct so-called videophone communications by sending sound data and image data obtained by the camera to an opposite unit, and receiving sound data and image data sent from the opposite unit, and by outputting the sound from a speaker and displaying the image in a display.

The following problems occur when such units are made portable.

Conventionally, even in so-called portable phones or PHS phones used to transmit only sound data, there were cases in which disturbances occurred in data transmission between a unit and an opposite unit for a variety of reasons, such as base station crowding (traffic), handovers occurring during the switching of base stations which accompanied the movement of the users, weak electrical fields produced when the radio situation between a unit and its base station was poor, and the like.

In such cases, conventional portable telephone units which transmitted only sound data simply experienced interruptions in the sound; however, when portable videophone units such as those described above are employed, when videophone communications are conducted, when the transmission of image data cannot be conducted well for the reasons described above, there are problems such as incomplete images which are displayed in the display.

In response to this, methods which exist for data transfer which are capable of correcting the data when an error is caused in the transmission of image data are, for example, those termed the FEC method and the ARQ method and the like (details thereof will be given hereinbelow).

However, even when the data are corrected using these methods, images are transmitted in order at fixed intervals by portable videophone units, so that until the image is switched, if the data of the image which is to be subsequently displayed cannot be corrected, it becomes impossible to display the subsequent image in the display, and from the perspective of the user, the images displayed in the display will appear unnatural.

BRIEF SUMMARY OF THE INVENTION

The present invention was created in view of the points described above, and has as an object thereof to provide a portable videophone unit which is capable of displaying images in the display without an unnatural feeling, even when the transmission of image data is not conducted satisfactorily.

A first aspect of the present invention is a portable videophone unit having a data transmitting-receiving section which transmits and receives image data and sound data to and from an opposite unit, which is provided with a display which at least displays images obtained by decoding image data transmitted from the opposite unit, and a control unit which controls the images displayed in the display; the structure is such that image data of a plurality of images are successively transmitted in amounts of one image at a time, and in the control unit, after it is confirmed that all the image data of the image to be displayed have been received, the image obtained by decoding this image data is displayed in the display.

In this way, an image is displayed in the display after all the image data are complete, so that it is possible to display a complete image in the display.

In a second aspect of the present invention, in the portable videophone unit of the first aspect described above, in order to confirm that all the image data of the image have been received, an end signal contained in the frame end of the image data is detected.

In a third aspect of the present invention, in the portable videophone unit of the first or second aspect, the image displayed in the display continues to be displayed until it is confirmed that all the image data of the image have been received.

By continuing to display the previous image until it is confirmed that all the image data have been received, there is no interruption in the image displayed in the display. At this time, at predetermined intervals, the image displayed in the display may be temporarily erased and redisplayed.

In a fourth aspect of the present invention, in the portable videophone unit of one of the first through third aspects, when it is impossible to confirm the receipt of all the image data of the image, the image data of the image are discarded, and the decoding of the image data of a subsequent image is initiated.

By means of this, when the receipt of all the image data cannot be confirmed within a preset time period, or when confirmation is impossible even after generating a predetermined number of data retransmission requests in the ARQ method, it is possible to discard the image data of that image and to display the subsequent image.

In a fifth aspect of the present invention, in the portable videophone unit of one of the first through fourth aspects, the plurality of images transmitted in succession from the opposite unit are images obtained at predetermined intervals by the image acquisition section provided in the opposite unit.

Images obtained at predetermined intervals in the opposite unit are transmitted in succession, so that still images are displayed in succession at predetermined intervals in the display.

In a sixth aspect of the present invention, in the portable videophone unit of one of the first through fifth aspects, when the receipt of the all of the image data of the image cannot be confirmed, the image data of the image are corrected by the correction section.

When the image data are not complete, the image data are corrected by a correction section using the ARQ method or the FEC method or the like, and it is possible to display an image at the point in time at which the image data are completed.

In a seventh aspect of the present invention, in the portable videophone unit of one of the first through sixth aspects, when image data and character data are transmitted from the opposite unit, the data correction is conducted by the ARQ method.

When image data and character data are transmitted, in other words in the case of mail with an attached image, by correcting the image data where necessary using the ARQ method, it is possible to reliably display the image and the series of characters without gaps in the data.

In an eighth aspect of the present invention, in the portable videophone unit of one of the first through seventh aspects, the sound data transmitted from the opposite unit are corrected using the FEC method.

The frame unit when sound data are transmitted and received is, for example, approximately 30 ms, so that transmission of the sound data is conducted at high speed, and it is possible to prevent interruptions and the like in the sound.

In a ninth aspect of the present invention, in the portable videophone unit of one of the first through eighth aspects, after a first image is displayed in the display, the image data of another image subsequently transmitted are differential data with respect to the image data of the immediately previous image.

By means of this, it is possible to apply the composition described above to the so-called frame differential method as well.

BRIEF DESCRIPTION OF THE SEVERAL VIEWS OF THE DRAWING

FIG. 5 shows the correction method in the data correction section; FIG. 5A shows the FEC method, while

DETAILED DESCRIPTION OF THE INVENTION

Hereinbelow, an example of an embodiment of a portable videophone unit in accordance with the present invention will be explained with reference to FIGS. 1 through 7.

Figure 1:
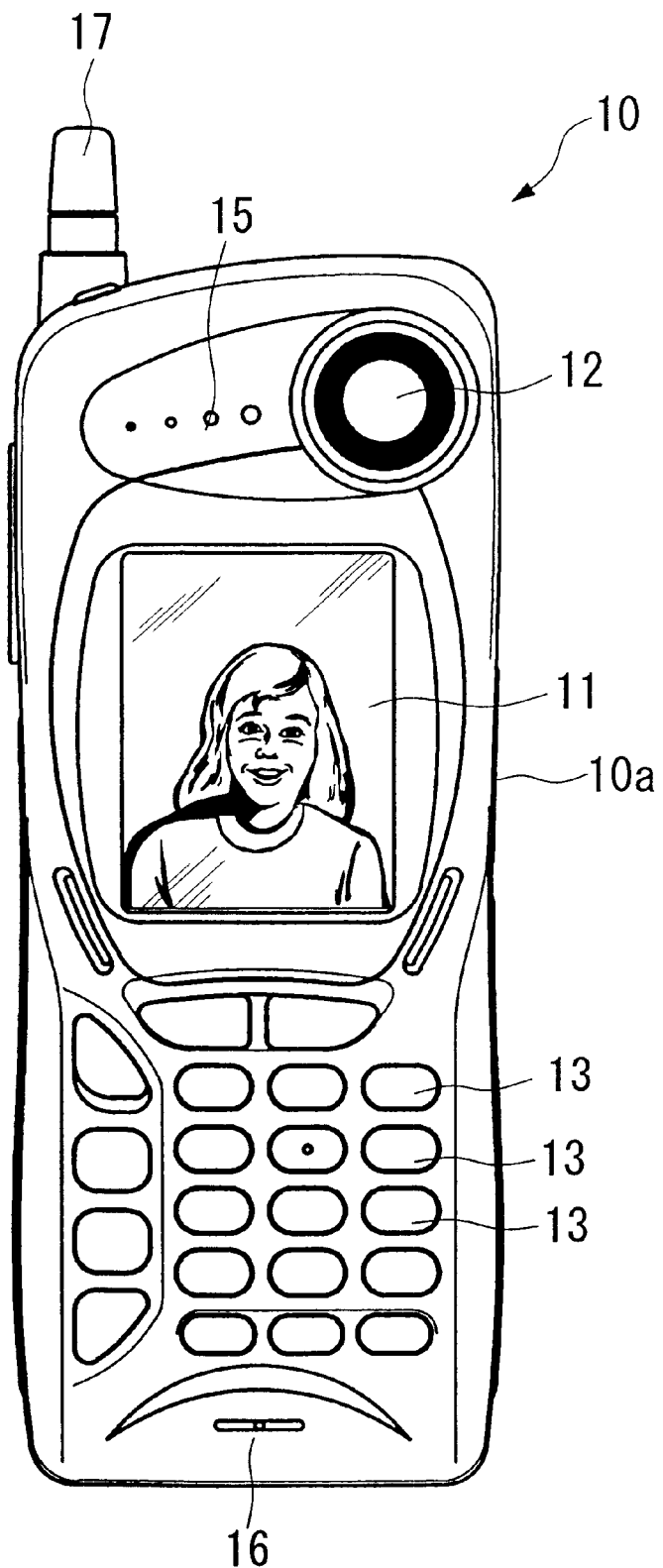
FIG. 1 shows an example of a portable videophone unit in accordance with the present invention; it is a front view showing the outer appearance of this unit.
Figure 2:
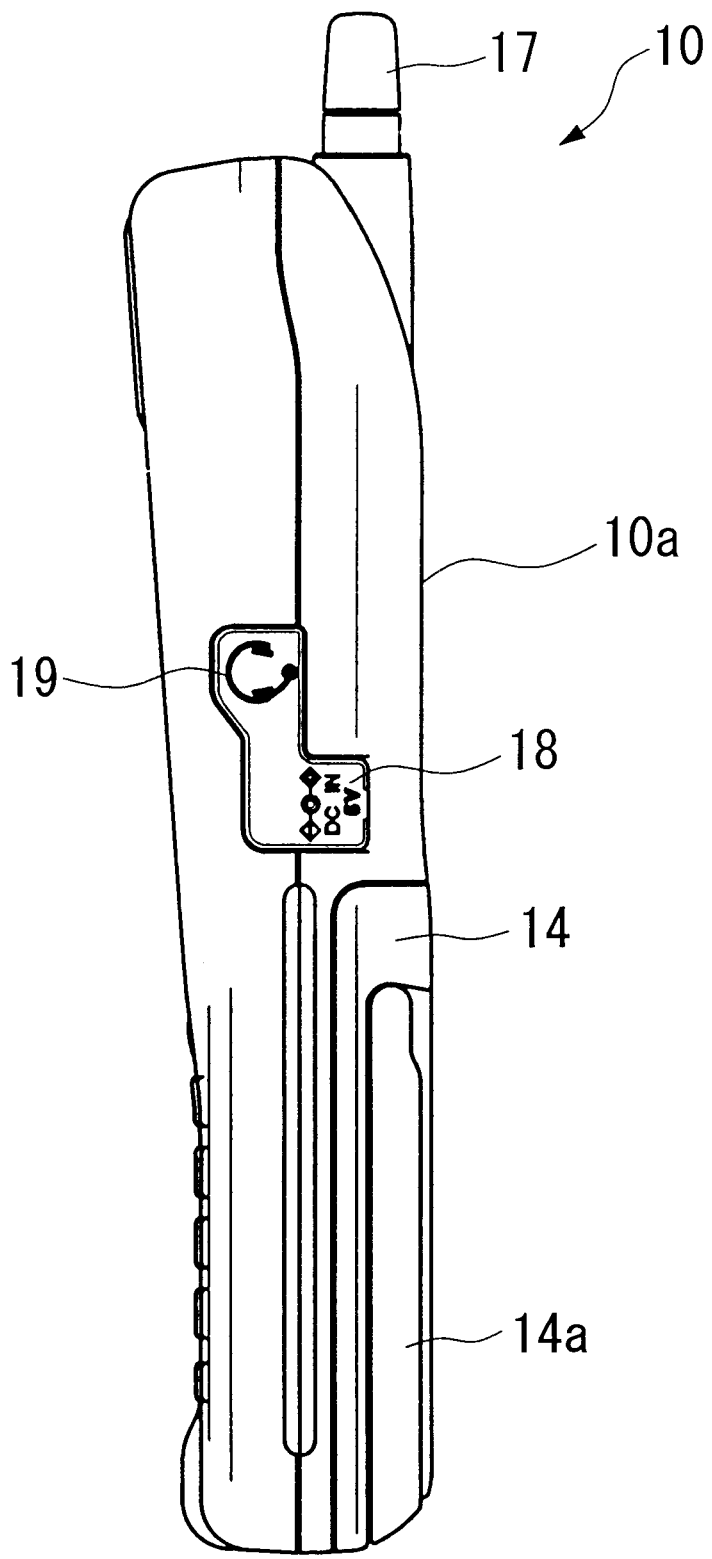
FIG. 2 is a right side view of FIG. 1.
Figure 3:
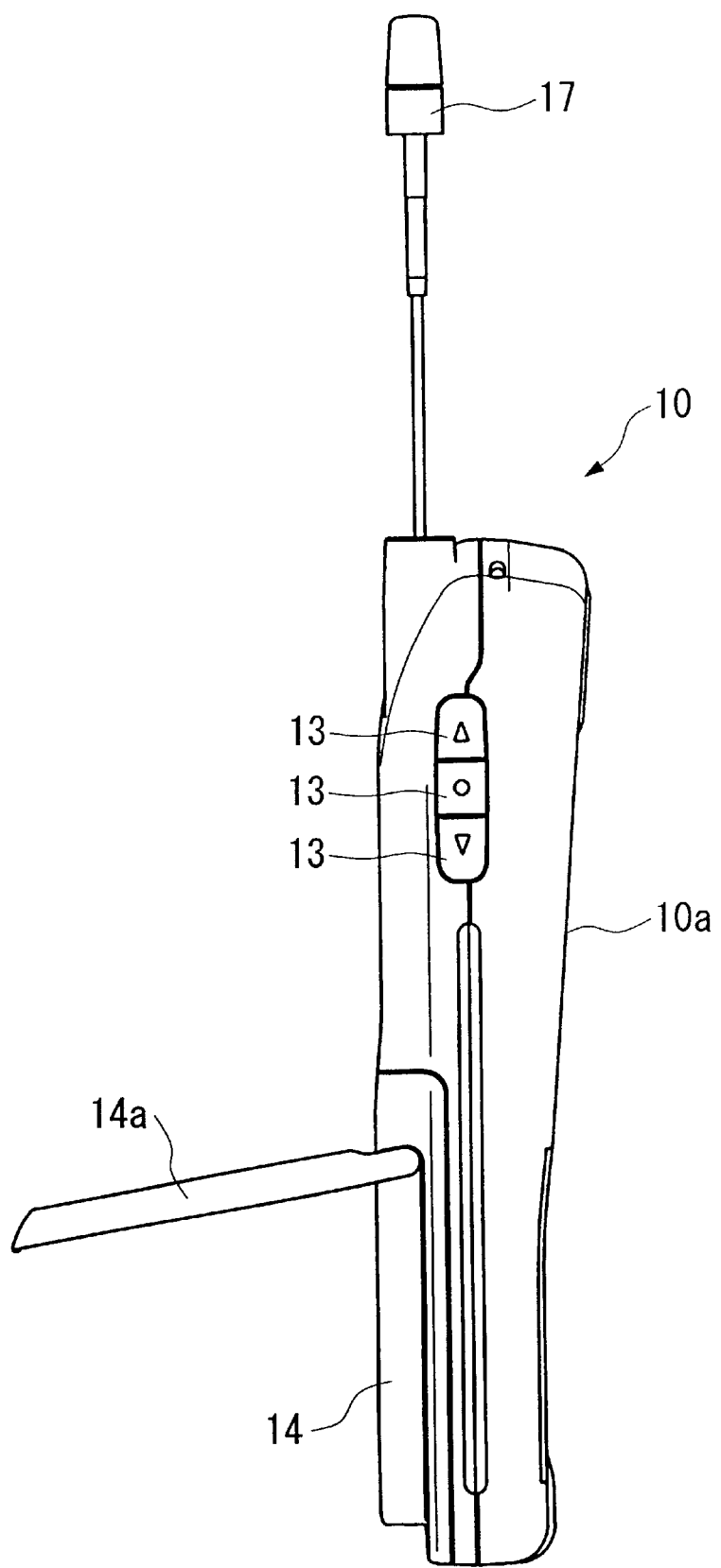
FIG. 3 is a left side view of FIG. 1.

What is shown in FIGS. 1 through 3 is a portable videophone unit 10 which is capable of conducting not merely telephone communications by means of standard sound data, but so-called videophone communications by means of the interchange of image data, via, for example, PHS circuits. Here, FIG. 1 is a front view showing the outward appearance of the portable videophone unit 10, while FIGS. 2 and 3 are side views showing the outward appearance of the portable videophone unit 10.

As shown in FIGS. 1 through 3, in portable videophone unit 10, a display 11 comprising a liquid crystal plate is provided in the front surface of the case 10a. Either communication function data in the portable telephone unit, such as the telephone number or a pictograph indicating the field strength, or image data, or both, are displayed in this display 11.

A camera 12 is provided in this case 10a at the upper part of the front surface thereof, and images are acquired by this camera 12. Furthermore, a plurality of keys 13 for operation are provided beneath the display 11, and by pressing these keys 13, it is possible to conduct various operations. Furthermore, the operational keys 13 are also provided on one side of the case 10a.

A receiving speaker 15 is provided at the side of the camera 12 in the upper part, and microphone 16 is provided at the bottom part, and sound input is conducted using the microphone 16, while the sound of the opposite party, the alert sounds, alarms, and the like are emitted by the receiving speaker 15. An extendible antenna 17 is provided at the upper end of case 10a, and a data transmitting-receiving section which is housed internally and is not depicted in the figure conducts image data and sound data communication via antenna 17.

Furthermore, at the other side part of case 10a, an external power source connecting unit 18, which is connected with an AC power source such as a plug socket or the like via an adapter, and an external sound output unit 19, which is connected with an earphone or the like, are provided.

Furthermore, in the back surface of case 10a, a battery cover 14, which is attached to a storage unit for storing batteries, is provided, and a stand 10a which is coupled in a rotatable manner within a predetermined angular range is provided in this battery cover 14. By rotating this stand 14a and increasing the angle, the case 10a is supported in an angled state with respect to a surface on which it is placed.

Figure 4:
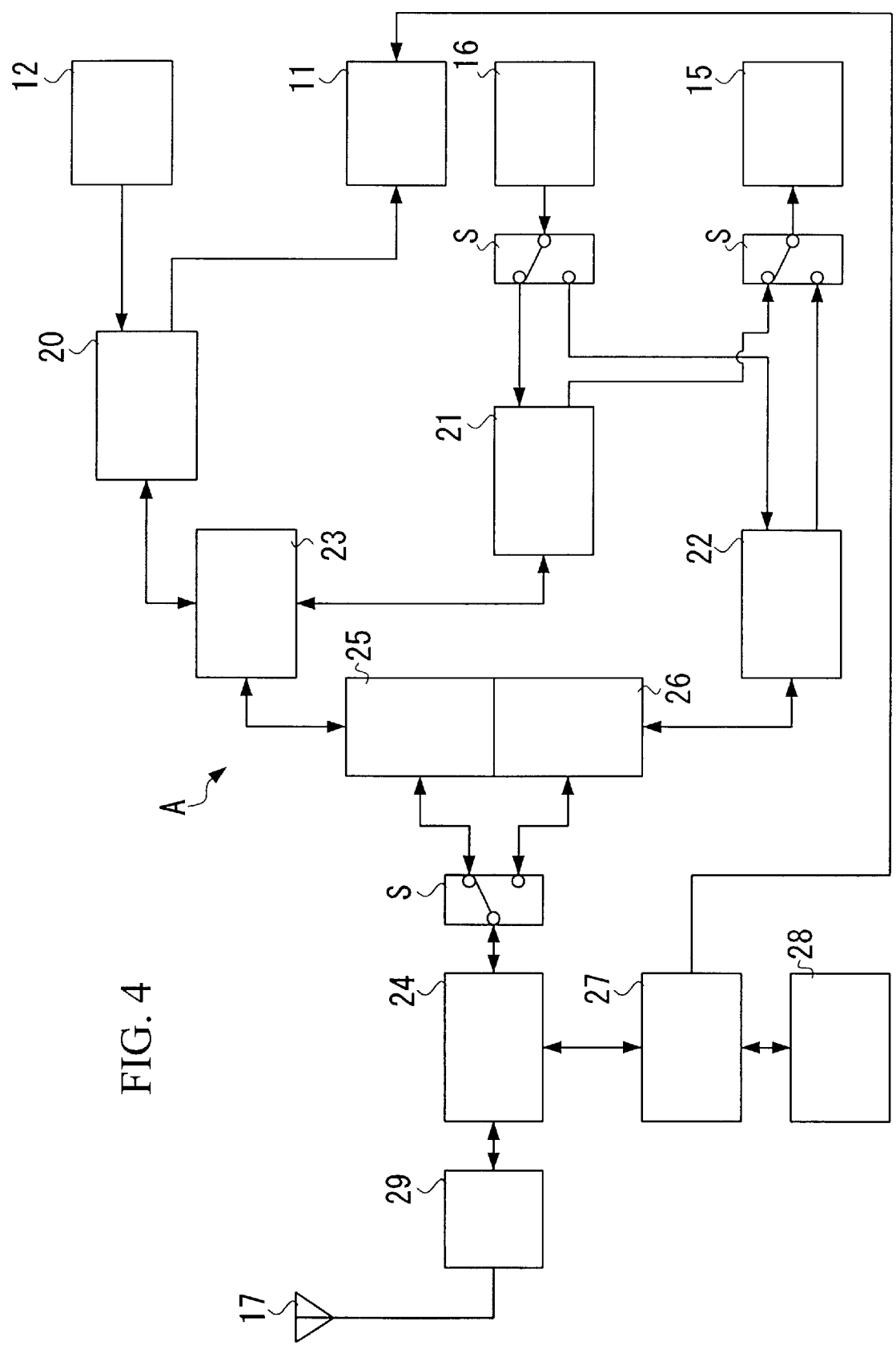
FIG. 4 is a schematic showing the circuit structure of the control unit in this unit.

FIG. 4 is a block diagram showing the circuit structure of a control unit A of the portable videophone unit 10 described above.

In this FIG. 4, image codec 20 compresses the image data inputted from camera 12 using a transformation method such as, for example, discrete cosine transformation (DCT) or wavelet transformation, and encodes these into an image code form using an encoding mechanism such as Huffman encoding or arithmetic encoding. Furthermore, the image codes sent by this image codec 20 are decoded and are displayed in display 11. In the present embodiment, the image data are in, for example, the JPEG format.

Furthermore, among sound codecs 21 and 22, a codec for image transmission and a codec for sound transmission are provided; however, the function thereof is identical, and these encode sound signals inputted from the microphone 16 into a predetermined sound data format using a sound encoding method, and furthermore, decode sound data which have been transmitted to sound signals using a predetermined decoding method, and send these to receiving speaker 15 for replay.

Multiplexing/demultiplexing section 23 separates the image data and the sound data from the received data, and transmits these to image codec 20 and sound codec 21, and multiplexes the image data and sound data received from image codec 20 and sound codec 21 and transmits these to time-division multiplexing circuit 24 (a so-called TDMA).

Image communication error correction section 25 and sound communication error correction section 26 correct the image data and sound-data received using a predetermined data correction mechanism such as the FEC (forward error correction) method, the ARQ (automatic repeat request) method, or the like.

Figure 5A:
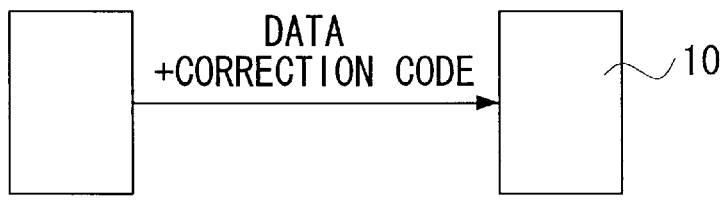

As shown in FIG. 5A, in the FEC method, when the data are transmitted, a correction code is attached in advance, and if there are errors in the data transmitted, the data are corrected using the correction code. In this way, because a correction code is contained in advance in the FEC method, there is an advantage in that the correction of the image data is rapid.

Figure 5B:
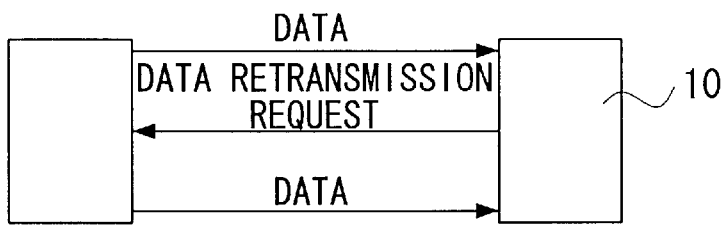
FIG. 5B shows the ARQ method.

As shown in FIG. 5B, what is meant by the ARQ method is a method in which the presence of errors in the data is communicated to the opposite side, and a request is generated for the retransmission of the data. In the ARQ method, data retransmission requests are generated so long as there are errors in the data, and this has the advantage that there are no errors in the data and it is possible to correctly conduct data transfer.

Time-division multiplexing circuit 24 converts the data received into a predetermined data signal with respect to the portable videophone unit 10, and converts the data signal which is to be transmitted into a predetermined transmission format.

CPU 27 controls every part of the portable videophone unit 10, and has the function of displaying, for example, telephone numbers or the date and time in display 11. Furthermore, memory unit 28 stores various data. Furthermore, radio section 29 and antenna 17 actually conduct the transmission and reception of data frames containing the image data and sound data.

Furthermore, what is indicated in the figure by reference S is a switching unit which conducts the switching of the circuitry based on whether the data received are provided with both image data and sound data, or are only sound data.

In a portable videophone unit 10 having this structure, when only sound data are transmitted and received, that is to say, when standard telephone communications are conducted, the sound data received are decoded by sound codec 22, and are outputted from receiving speaker 15, while the sound data of the user inputted into microphone 16 are encoded by sound codec 22, and these are transmitted, and thereby, it is possible to conduct telephone communications by sound.

When, at this time, the sound data transmitted contain errors as a result of, for example, traffic, handover, or weak electrical fields, or the like, the correction of the data by the FEC method is conducted in sound communication error correction section 26. At this time, the sound data are commonly transmitted in frames having a length of approximately, for example, 30 ms or the like; by rapidly conducting data correction using the FEC method, it is possible to minimize sound interruptions.

Furthermore, in this portable videophone unit 10, when image data and sound data are transmitted and received, so that so-called videophone communication is conducted, the image data and the sound data are separated in multiplexing/demultiplexing section 23, and the image data are decoded by image codec 20, and the image transmitted is displayed in display 11. Furthermore, the image of the user which is obtained by camera 12 is converted into image data by image codec 20, and this is transmitted to the opposite unit via multiplexing/demultiplexing section 23.

Furthermore, with respect to the sound data received, the sound codec 21 carries out the same functions as the sound codec 22 for sound communication, and encodes the sound data inputted from the microphone 16 and transmits these to the opposite unit, and decodes sound data received and outputs a sound from receiving speaker 15.

At this time, in portable videophone unit 10, fundamentally, approximately 2 frames of image data are displayed per second. This means that the camera (image acquisition section) of the opposite unit conducts image acquisition at intervals of 0.5 seconds, and transmits the image data of the acquired images to the portable videophone unit 10.

When this is done, in the portable videophone unit 10, the first image data are received, and after display is conducted by display 11, switching to the subsequent image is conducted after 0.5 seconds.

In portable videophone unit 10, when there are errors in the image data which are transmitted in succession fundamentally at intervals of 0.5 seconds as described above, as a result of traffic, handover, or weak electrical fields or the like, then the data are corrected by the ARQ method (abbreviation) or the FEC method or the like in image communication error correction section 25, and these are displayed in display 11.

Furthermore, in portable videophone unit 10, until it is confirmed that the image data of an image which is to be subsequently displayed are complete, that image is not displayed in display 11, and the previous image (the image displayed at that point in time) continues to be displayed.

Figure 6:
FIG. 6 shows the frame arrangement of the image data.

As shown in FIG. 6, frame F of the image data which are transmitted comprises, from the top thereof, an SOI (start of image) signal, which serves as an image top marker, tables and the like which are inserted where necessary, image data, and an EOI (end of image) signal (end signal), which serves as an image end marker.

Figure 7:
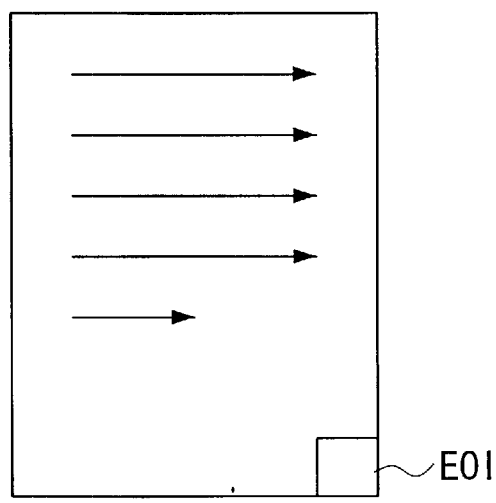
FIG. 7 shows the position at which the end signal is generated when the image data are decoded.

The confirmation that all the image data are complete is conducted by receiving, for example, the EOI signal within the frame F. As shown in FIG. 7, this EOI signal is obtained at a point in time at which the image data contained within the frame have been successively decoded and the decoding of all image data has been completed.

Furthermore, if the image data of the image which is to be subsequently displayed are not complete within a preset period of time, or if the number of data retransmission requests has reached a preset number when the ARQ method is employed, the image data of this image are discarded, and the decoding operation of the image data of subsequent image is conducted. In other words, in this case, the image which is displayed in display 11 is skipped with respect to images for which the transmission of image data is not completed, and the subsequent image is displayed.

By means of this, it is possible to prevent a situation in which the screen does not change for a long period of time.

Until the display of the subsequent image, the same image continues to be displayed in display 11; however, at this time, the displayed image may be erased temporarily at predetermined intervals and redisplayed. By means of this, from the point of view of the user, this has the effect of giving the impression that the image displayed in display 11 changes at predetermined intervals.

Either the FEC method or the ARQ method may be appropriately established in the image communication error correction section 25 in accordance with the required conditions. For example, in the case in which image data and character data are exchanged, that is to say, in the case of so-called mail communication with attached images, it is necessary to accurately display the mail characters, so that the ARQ method is appropriate.

As described above, in the portable videophone unit 10, an image is displayed in display 11 at the point in time at which the image data of the image to be displayed are complete, and until this point, the previous image continues to be displayed, so that a state does not occur in which the image in display 11 fails to be completely displayed or disappears completely, so that the user is not left with a feeling of unnaturalness.

In the embodiment described above, a structure which detected the EOI signal within the frame F of the data was employed as the mechanism for confirming the completeness of the image data of the image to be displayed; however, other mechanisms may be adopted.

Furthermore, in the embodiment described above, a structure employing the JPEG format was used with respect to the transmitted image data; however, other image formats are possible.

Additionally, in the embodiment described above, the frame F of the data for transmission and the like is not limited to that depicted, and other formats are possible.

Furthermore, the FEC method and the ARQ method were given as examples of mechanisms for conducting data correction; however, either of these may selected on a case by case basis, or if there are other effective methods, these may be adopted.

Furthermore, when the volume of communication is large, the sound data may be transmitted on a single channel using the FEC method, while the transmission of files or character data or image data or the like may be conducted on the other remaining channel using the ARQ method.

Furthermore, in the embodiment described above, PHS circuitry was used as an example of the telephone circuitry employed in the portable videophone unit 10; however, it is not intended that this should be so limited, and it is possible to employ portable telephone circuitry of various other standards other than PHS circuitry which are established in other regions.

Furthermore, in the embodiment described above, the structure was such that images acquired at predetermined intervals at the opposite unit, that is to say, still images, were transmitted in succession; however, this not necessarily so limited, and even in a frame differential method in which only data which differ from the previous image are transmitted, it is possible to apply the same structure as that described above.

Furthermore, if the object portable videophone unit 10 is provided with a display 11 and a camera 12, then, for example, camera 12 may have a freely detachable adapter or the like.

Additionally, the structure, position, or composition or the like of each part of the portable videophone unit 10, such as the display 11 or the like, may be freely altered.

Additionally, other structures may be adopted insofar as they are within a range which does not depart from the gist of the present invention, and furthermore, it is of course the case that the structures described above may be appropriately and selectively combined.

As explained above, in accordance with the portable videophone unit of the first aspect of the present invention, an image to be displayed is displayed in the display after all the image data are complete. As a concrete mechanism, in accordance with the portable videophone unit of the second aspect of the present invention, as a mechanism for confirming that the image data of the image are complete, an end signal contained in the frame end of the image data is detected.

In accordance with the portable videophone unit of the third aspect of the present invention, the previous image continues to be displayed until it is confirmed that all the image data of the image have been transmitted, so that there is no interruption in the image displayed in the display, and as a result, the effect is to produce no feeling of unnaturalness in the user.

In accordance with the portable videophone unit of the fourth aspect of the present invention, when it is impossible to confirm that the image data are complete within a preset time period, or when confirmation is impossible even after generating a predetermined number of data retransmission requests in the ARQ method, it is possible to discard the image data of that image and to display the subsequent image. Accordingly, it is possible to prevent a long period of no change in the screen.

In accordance with the portable videophone unit of the fifth aspect of the present invention, images obtained at predetermined intervals in the opposite unit are transmitted and displayed in succession in the opposite unit, so that still images are displayed in succession at predetermined intervals. By displaying still images in succession at predetermined intervals in this way, it is possible to display images which are like moving images.

In accordance with the portable videophone unit of the sixth aspect of the present invention, when the image data are not complete, the image data are corrected by the ARQ method or the FEC method or the like and displayed.

In accordance with the portable videophone unit of the seventh aspect of the present invention, when image data and character data are transmitted, in other words in the case of mail with an attached image, by correcting the image data where necessary using the ARQ method, it is possible to reliably display the image and the mail characters without gaps in the data.

In accordance with the portable videophone unit of the eighth aspect of the present invention, the sound data transmitted from the opposite unit are corrected using the FEC method. The frame unit when sound data are transmitted and received is, for example, approximately 30 ms, so that by means of this, transmission of the sound data is conducted at high speed, and it is possible to prevent interruptions and the like in the sound.

In accordance with the portable videophone unit of the ninth aspect of the present invention, it is possible to apply the composition described above to the so-called frame differential method as well.

What is claimed is:

1. A portable videophone unit having a data transmitting-receiving section which transmits and receives image data and sound data to and from an opposite unit, which is provided with a display which at least displays images obtained by decoding image data transmitted from said opposite unit, and a control unit which controls the images displayed in the display;

wherein the structure is such that image data of a plurality of images are successively transmitted in amounts of one image at a time, in said control unit, after it is confirmed that all image data of an image to be displayed have been received, an image obtained by decoding said image data is displayed in the display, said image displayed in said display continues to be displayed until it is confirmed that all image data of a next image have been received, when the receipt of all of said image data of said next image cannot be confirmed, said image data of said next image are corrected by a correction section, and after said image data of said next image are corrected by said correction section, if it is impossible to confirm the receipt of all of said image data of said next image, said image data of said next image are discarded, and decoding of image data of a subsequent image is initiated.

2. A portable videophone unit in accordance with claim 1, wherein, in order to confirm that all said image data of the image have been received, an end signal contained in a frame end of said image data is detected.

3. A portable videophone unit in accordance with claim 1, wherein the plurality of images transmitted in succession from said opposite unit are images obtained at predetermined intervals by an image acquisition section provided in said opposite unit.

4. A portable videophone unit in accordance with claim 1, wherein, when image data and character data are transmitted from said opposite unit, data correction is conducted by the ARQ method.

5. A portable videophone unit in accordance with claim 1, wherein sound data transmitted from said opposite unit are corrected using the FEC method.

6. A portable videophone unit in accordance with claim 1, wherein, after a first image is displayed in said display, image data of another image subsequently transmitted are differential data with respect to image data of the immediately previous image.

7. A portable videophone unit in accordance with claim 1, wherein said image displayed in said display continues to be displayed while said image displayed is erased temporarily at predetermined intervals and redisplayed, until it is confirmed that all of said image data of said next image have been received.

8. A portable videophone unit in accordance with claim 1, wherein if it is impossible to confirm the receipt of all of said image data of said next image within a preset time period, said image data of said next image are discarded, and decoding of image data of a subsequent image is initiated.

9. A portable videophone unit having a data transmitting-receiving section which transmits and receives image data and sound data to and from an opposite unit, which is provided with a display which at least displays images obtained by decoding image data transmitted from said opposite unit, a control unit which controls the images displayed in the display, a sound coder which decodes sound data, and a sound output section which receives the decoded sound data and outputs a sound;

wherein the structure is such that image data of a plurality of images are successively transmitted in amounts of one image at a time, in said control unit, after it is confirmed that all image data of an image to be displayed have been received, an image obtained by decoding said image data is displayed in the display, said image displayed in said display continues to be displayed until it is confirmed that all image data of a next image have been received, and said sound output section outputs a sound with substantially no interruption.

10. A portable videophone unit in accordance with claim 9, comprising an error correction section which corrects said sound data from said opposite unit using the FEC method and corrects said image data from said opposite unit using the ARQ method.

11. A portable videophone unit in accordance with claim 9, wherein the sound data are transmitted on a single channel using the FEC method, while the image data are transmitted on another channel using the ARQ method.

* * * * *